(12) United States Patent
Schiavoni et al.

(10) Patent No.: US 10,246,363 B2
(45) Date of Patent: Apr. 2, 2019

(54) TEXTURED GLASS FOR GREENHOUSES

(71) Applicant: SAINT-GOBAIN GLASS FRANCE, Courbevoie (FR)

(72) Inventors: Michele Schiavoni, Paris (FR); Mathieu Berard, Paris (FR); Emmanuel Mimoun, Boulogne-Billancourt (FR); Simon Mazoyer, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/568,261

(22) PCT Filed: Apr. 19, 2016

(86) PCT No.: PCT/FR2016/050903
§ 371 (c)(1),
(2) Date: Oct. 20, 2017

(87) PCT Pub. No.: WO2016/170261
PCT Pub. Date: Oct. 27, 2016

(65) Prior Publication Data
US 2018/0141845 A1  May 24, 2018

(30) Foreign Application Priority Data

Apr. 23, 2015 (FR) ..................................... 15 53648
May 7, 2015 (FR) ..................................... 15 54131

(51) Int. Cl.
*C03B 13/08* (2006.01)
*G02B 5/02* (2006.01)
(Continued)

(52) U.S. Cl.
CPC ............ *C03B 13/08* (2013.01); *A01G 9/1438* (2013.01); *A01G 9/243* (2013.01); *C03C 19/00* (2013.01);
(Continued)

(58) Field of Classification Search
CPC ...................................................... C03B 13/08
See application file for complete search history.

(56) References Cited

U.S. PATENT DOCUMENTS

| 653,238 A | * | 7/1900 | Hartung | ................. C03B 13/08 65/255 |
| 2004/0086716 A1 | | 5/2004 | Weikinger | |

(Continued)

FOREIGN PATENT DOCUMENTS

| CH | 693 771 A5 | 1/2004 |
| EP | 1 449 017 B1 | 8/2007 |

(Continued)

OTHER PUBLICATIONS

International Preliminary Report on Patentability and the Written Opinion of the International Searching Authority as issued in International Patent Application No. PCT/FR2016/050903, dated Oct. 24, 2017.

(Continued)

*Primary Examiner* — David Sample
(74) *Attorney, Agent, or Firm* — Pillsbury Winthrop Shaw Pittman LLP

(57) ABSTRACT

A transparent sheet includes a texture in relief on a first of its main faces, such that, if n is the refractive index of the material including the texture, $P_m$ is the mean slope in degrees of the textured face and $Y(q)$ is the percentage of the textured surface with a slope greater than $q/(n-1)$ in degrees, (Continued)

Figure 1:
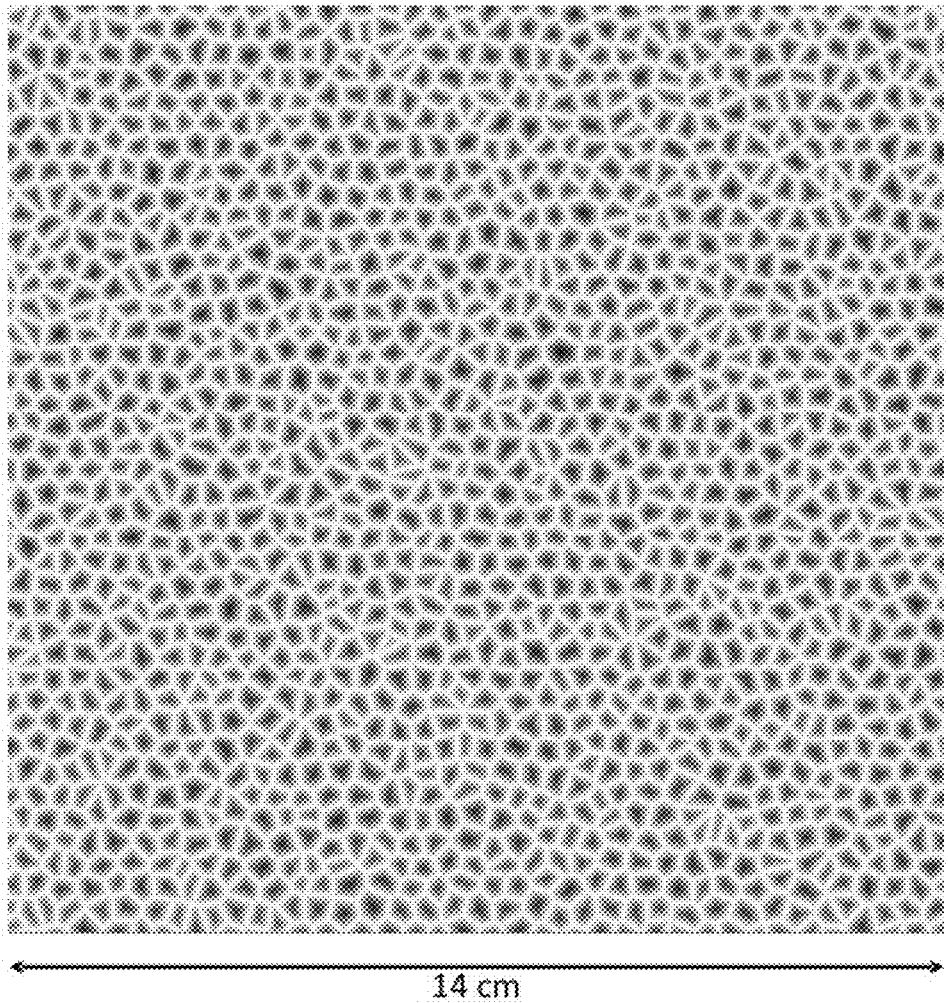

then the two cumulative conditions exist: $Y(q)>3\%+f(q)\%*P_m*(n-1)$ and $Y(q)>10\%$, with $f(q)=24-(3*q)$ and $q=2$ or $3$.

26 Claims, 7 Drawing Sheets

(51) Int. Cl.
  *G02B 5/04* (2006.01)
  *C03C 19/00* (2006.01)
  *C03C 23/00* (2006.01)
  *A01G 9/24* (2006.01)
  *A01G 9/14* (2006.01)
  *F24S 80/50* (2018.01)

(52) U.S. Cl.
  CPC .............. *C03C 23/00* (2013.01); *G02B 5/021* (2013.01); *G02B 5/0231* (2013.01); *G02B 5/045* (2013.01); *F24S 80/50* (2018.05); *F24S 2080/501* (2018.05); *Y02A 40/252* (2018.01); *Y02A 40/266* (2018.01); *Y02P 60/124* (2015.11)

(56) References Cited

U.S. PATENT DOCUMENTS

| | | |
|---|---|---|
| 2005/0039788 A1 | 2/2005 | Blieske et al. |
| 2007/0240754 A1* | 10/2007 | Gayout ................ B29C 43/222 |
| | | 136/246 |
| 2011/0281078 A1 | 11/2011 | Schiavoni et al. |
| 2012/0183734 A1 | 7/2012 | Schiavoni et al. |

FOREIGN PATENT DOCUMENTS

| | | |
|---|---|---|
| WO | WO 03/046617 A1 | 6/2003 |
| WO | WO 2010/084290 A1 | 7/2010 |
| WO | WO 2011/006957 A2 | 1/2011 |
| WO | WO 2014/111662 A1 | 7/2014 |
| WO | WO 2014/131610 A1 | 9/2014 |
| WO | WO 2015/032618 A1 | 3/2015 |

OTHER PUBLICATIONS

International Search Report as issued in International Patent Application No. PCT/FR2016/050903, dated Jul. 18, 2016.
"Transvision: a Light Transmission Measurement System for Greenhouse Covering Materials," Proc. $7^{th}$ IS on Light in Horticultural Systems, Eds., Acta Hort., 956, ISHS, (2012), pp. 563-568.

* cited by examiner a)

b)

TEXTURED GLASS FOR GREENHOUSES

CROSS-REFERENCE TO RELATED APPLICATIONS

This application is the U.S. National Stage of PCT/FR2016/050903, filed Apr. 19, 2016, which in turn claims priority to French patent application number 1553648 filed Apr. 23, 2015 and French patent application number 1554131 filed May 7, 2015. The content of these applications are incorporated herein by reference in their entireties.

The invention relates to the field of highly transparent and scattering glazings, in particular for horticultural greenhouses.

Currently, flat glazings not textured at the surface are predominantly used for the greenhouses for horticulture application. For some years, textured glazings, the texture of which is obtained by rolling, have appeared for this application. These textured glasses scatter the light, which has a positive impact on horticultural production. This is because the scattering effect prevents hot spots on the plants and makes possible better penetration of the light through all the regions of the greenhouse and makes it possible to obtain lighting which is more uniform. On the other hand, these glasses have a lower transmission in comparison with the same nontextured glass, which has a negative impact on horticultural production. The high transmission desired for these glazings is what is known as hemispherical transmission (TLH, sometimes denoted THEM), that is to say the transmission meaned over several angles of incidence. For each angle of incidence, all the light intensity passing through the glazing is measured, whatever the angle of emergence. A glazing for greenhouses preferably has a high TLH and a high haze (as determined by the haze value, referred to as H). The haze is the ratio of the diffuse transmission to the total transmission of the glazing. The hemispherical transmission is an essential characteristic of this type of glazing and it is not generally desired for the glazing to lose more than 5% and preferably not more than 3% of TLH because of its scattering texture with respect to a flat nontextured glass of the same nature and the same weight per unit area. A gain or a loss of 1% in TLH is already very substantial. For the haze, a significant variation is instead of the order of 10%.

Photovoltaic glazings, such as those sold under the Albarino-S and Albarino-T brands by Saint Gobain, make it possible to obtain substantially this type of behavior. However, for Albarino-S, the H is high but the TLH has deteriorated with respect to a flat glass of the same nature and, for Albarino-T, the TLH remains at a high level close to that of a smooth glass of the same nature but the H is too low. Even if they represent a degree of improvement with respect to a nontextured glazing, these glazings are thus not ideal. WO 03046617 teaches a plate textured by pyramids for photovoltaic use. The Albarino-P sold by Saint Gobain has a structure of this type. The faces of its pyramids have a slope approaching 45° but, due to rounded sections unintentionally produced in practice, the texture of this glazing has in reality a mean slope of approximately 30° with respect to the general plane of the glazing. While such a texture leads to a high H, the TLH is on the other hand inadequate. The invention provides a better compromise of these two properties, TLH and H, with respect to the known textured glazings.

WO 2015/032618 teaches a textured glass sheet comprising a first face provided with a first texturing and a second face provided with a second texturing, and also an assembly comprising such a glass sheet and at least one element intended to use solar radiation positioned under the glass sheet.

The invention relates first to a transparent sheet comprising a texture in relief on a first of its main faces, such that, if n is the refractive index of the material comprising the texture, $P_m$ is the mean slope in degrees of the textured face and $Y(q)$ is the percentage of the textured surface with a slope greater than $q/(n-1)$ in degrees, then the two cumulative conditions exist with regard to $Y(q)$:

$$Y(q) > 3\% + f(q)\% * P_m * (n-1)$$

and $Y(q) > 10\%$ with $f(q) = 24 - (3*q)$ and $q = 2$ or $3$.

Preferably, $Y(q) > 5\% + f(q) \%*P_m*(n-1)$. More preferably, $Y(q) > 10\% + f(q) \%*P_m*(n-1)$. Preferably, $f(q) = 27 - (3*q)$ and even $f(q) = 30 - (3*q)$.

In particular, one of the following eight combinations is particularly suitable:

$Y(q) > 5\% + f(q)\%*P_m*(n-1)$ with $f(q) = 27 - (3*q)$ and $q=2$; or $Y(q) > 5\% + f(q)\%*P_m*(n-1)$ with $f(q) = 27 - (3*q)$ and $q=3$; or $Y(q) > 5\% + f(q)\%*P_m*(n-1)$ with $f(q) = 30 - (3*q)$ and $q=2$; or $Y(q) > 5\% + f(q)\%*P_m*(n-1)$ with $f(q) = 30 - (3*q)$ and $q=3$; or $Y(q) > 10\% + f(q)\%*P_m*(n-1)$ with $f(q) = 27 - (3*q)$ and $q=2$; or $Y(q) > 10\% + f(q)\%*P_m*(n-1)$ with $f(q) = 27 - (3*q)$ and $q=3$; or $Y(q) > 10\% + f(q)\%*P_m*(n-1)$ with $f(q) = 30 - (3*q)$ and $q=2$; or $Y(q) > 10\% + f(q)\%*P_m*(n-1)$ with $f(q) = 30 - (3*q)$ and $q=3$.

In the context of the present patent application and in particular in the examples, the TLH and the haze are measured according to the methods described in detail in "Proc. 7th IS on Light in Horticultural Systems, Eds: S. Hemming and E. Heuvelink, Acta Hort., 956, ISHS, 2012". In this document, mention is made of a haze measured at 1.5°. In point of fact, in the field of transparent materials, the haze is often measured at 2.5°. A standard has not yet been fully asserted in the field of greenhouses for horticulture, although the haze at 1.5° is today the one most widely used. According to the invention, an f(q) is introduced in order to take into account these two ways of measuring the haze. In order to maximize a haze at 1.5° while retaining a very good compromise with the TLH, q=2 is taken, whereas, in order to maximize a haze at 2.5° while retaining a very good compromise with the TLH, q=3 is taken.

According to the invention, use is made of a glazing having a distribution of slopes comprising relatively few regions with a very low slope and few regions with a high slope and the distribution of slopes of which is in the vicinity of $q/(n-1)$ in °, with $q=2$ or $3$, that is to say approximately 4° for $q=2$ and approximately 6° for $q=3$ for glass with an index of 1.5. By virtue of this geometry, a much better combination of TLH and H values is obtained.

The texture in relief can be produced in a material of the organic or inorganic glass type. In particular, a mineral glass comprising at least 40% by weight of $SiO_2$ may be concerned.

The refractive index of the material comprising the texture is generally within the range extending from 1.4 to 1.65 at 587 nm.

The sheet is not very absorbent in the spectral range of photosynthesis (400-700 nm) and it is the same for any material included in the sheet. The absorption of the sheet according to the invention in this spectral range is less than 2% and preferably less than 1% and even less than 0.5%. The absorption is obtained by the measurement of the transmission and reflection in normal incidence and by the relationship Absorption (%)=100%−transmission (%)−reflection (%). The transmission and reflection measurements (overall and measured using an integrating sphere) are carried out using a spectrophotometer and correspond to a mean of the transmission and reflection values for the wavelengths of the 400-700 nm range.

The slope at a point of the surface of a sheet corresponds to the angle formed between the plane tangent to this point and the general plane of the sheet. The measurement of the slope at a point is carried out from the measurement of the variation in height in the vicinity of this point and with respect to the general plane of the sheet. A person skilled in the art knows the devices capable of carrying out these height measurements. The measurement of the mean slope $P_m$ of the surface is determined from the measurement of slopes at points distributed over a square lattice with a period of 20 µm. The mean of the slope of all these points is then calculated.

Preferably, the texture comprises relatively large patterns as this makes it possible to better control the slopes actually created by rolling. This is because it is in practice very difficult to obtain, by rolling, a texture with controlled slopes when the period of the patterns is less than 1 mm, in particular in a mineral glass. The rolling process necessarily produces undesired rounded sections and these rounded sections with uncontrolled slopes occupy increasingly more of the surface area as the base pattern decreases in size. By enlarging the pattern, the same rounded section occupies a smaller fraction of the total period of the pattern and thus has a weaker impact.

In order to obtain, by rolling, a texture close to that desired, patterns are preferably produced having a size of at least 1 mm and preferably of at least 1.5 mm and even preferably of at least 2 mm and even preferably of at least 2.5 mm (the term "size" is understood to mean the diameter of the smallest circle containing the pattern). Preferably, the patterns have a size of at most 8 mm. Preferably, the patterns are contiguous.

It should be remembered that the $R_{Sm}$ (mean period or mean pitch) of a profile (that is to say, according to a straight-line segment) of a surface is defined by the relationship:

$$R_{Sm} = \frac{1}{n}\sum_{i=1}^{i=n} Si = \frac{S_1 + S_2 + \ldots + S_n}{n}$$

in which Si is the distance between two zero crossings (median line) which are ascending, n+1 being the number of ascending zero crossings in the profile under consideration. This parameter $R_{Sm}$ is representative of the distance between peaks, that is to say of the pitch of the texture parallel to the general plane of the sheet. The $R_{Sm}$ values are given after use of Gaussian filters with cut-offs (or base lengths) at 25 µm and 8 mm (suppression of the periods of less than 25 µm and greater than 8 mm). The $R_{Sm}$ measurements are carried out over a distance of at least 40 mm. For any point of the textured surface, the $R_{Sm}$ around said point corresponds to the arithmetic mean of the $R_{Sm}$ values for 10 profiles starting star-shaped from the point under consideration. For the calculation of the $R_{Sm}$ around a point, the values greater than or equal to 40 mm are discarded. This prevents profiles in certain directing lines of specific textures, such as that of parallel prisms or of straight lines between aligned pyramids (infinite or noncalculable $R_{Sm}$ value), from being taken into account. A mean $R_{Sm}$ of a textured surface is also defined by calculating the arithmetic mean of the $R_{Sm}$ values around a point, the points being chosen on a square grid with a pitch of 5 cm.

Preferably, the mean $R_{Sm}$ of the textured surface is within the range extending from 1 mm to 8 mm and preferably within the range extending from 1.5 mm to 8 mm and even within the range extending from 2 mm to 8 mm and even within the range extending from 2.5 mm to 8 mm. More preferably, the $R_{Sm}$ around any point at the textured surface is within the range extending from 1 mm to 8 mm and preferably within the range extending from 1.5 to 8 mm and even within the range extending from 2 mm to 8 mm and even within the range extending from 2.5 mm to 8 mm.

The slopes produced on a mineral glass by hot rolling, generally within a temperature range extending from 800 to 1300° C., decrease slightly during the forming. Thus, if a mean slope with a value of $P_m$ is targeted at the glass sheet, use is preferably made of an engraved roll, the patterns of which have a mean slope of at least $P_m+0.5°$, indeed even of at least $P_m+1°$. The larger the patterns of the texture (higher mean $R_{Sm}$), the more the texture actually printed approaches that of the roll and the less necessary it is to introduce a correction to the patterns of the roll.

Thus, for a mean $R_{Sm}$ of between 1 and 1.5 mm, the mean slope of the texture of the roll can be increased by 0.5° to 10° with respect to the mean slope of the desired texture. For a mean $R_{Sm}$ of between 1.5 and 2 mm, the mean slope of the texture of the roll can be increased by 0.5° to 8° with respect to the mean slope of the desired texture. For a mean $R_{Sm}$ of between 2 and 2.5 mm, the mean slope of the texture of the roll can be increased by 0.5° to 6° with respect to the mean slope of the desired texture. For a mean $R_{Sm}$ of greater than 2.5 mm, the mean slope of the texture of the roll can be increased by 0.5° to 5° with respect to the mean slope of the desired texture. The patterns of the texture can be parallel linear patterns, such as parallel prisms, or can be patterns which can be inscribed in a circle, such as cones or pyramids.

The invention is of use in acting as glazing allowing the passage of light for greenhouses for horticulture, and also for other applications requiring a high TLH and a high H, such as a veranda, a reception hall or a public space.

According to the invention, both main faces of the sheet can exhibit a texture. In this case, if the texture of one of the two faces is not according to the invention, then, preferably, the texture according to the invention is that of the two faces having the greater mean slope. The face having the lower mean slope is preferably such that $P_m'*2*(n'-1)$ is less than 3° and even less than 2°, $P_m'$ and $n'$ respectively being the mean slope and the refractive index of the material comprising the texture of this face having the lower mean slope.

The invention also relates to a sheet with $P_m \cdot (n-1)$ greater than $P_m'*(n'-1)$, $P_m$ and $P_m'$ representing the mean slope respectively of the first main face and the second main face and n and n' being the refractive index of the material comprising the texture respectively of the first main face and of the second main face. Preferably, the texture of the second main face has a mean slope such that $P_m'*2*(n'-1)$ is less than 3° and even less than 2°. Preferably, if Y' (q) is the percentage of the textured surface with a slope greater than $q/(n'-1)$ in degrees of the second main face, then there exists the relationship:

$$Y'(q) > 3\% + f(q)\% * P_m'*(n'-1)$$

with $f(q) = 24 - (3*q)$ and q having the value 2 both for Y(q) and for Y'(q), or else q having the value 3 both for Y(q) and for Y'(q).

In particular, both faces of the sheet can be according to the invention.

An antireflective effect can be obtained on one or both faces of the sheet and in particular on the textured face. This antireflective effect can be obtained by the deposition of a layer or several layers forming a stack, by chemical attack or any other suitable technique. The antireflective effect is chosen in order to be effective at the 400-700 nm wavelengths. An antireflective coating (antireflective layer or stack of layers having an antireflective effect) generally has a thickness within the range extending from 10 to 500 nm.

The sheet can be made of a completely monolithic material. The sheet can also be made of a monolithic material to which an antireflective layer or a stack of layers having an antireflective effect has optionally been affixed on one of its faces or on both its faces. However, the texture can be produced in a first relatively thin material comprising the texture and combined, in the sheet, with a second material giving stiffness to the combined sheet. It is advisable for this first material to be present in a minimum thickness making possible the production of patterns in relief. Preferably, the difference in the refractive indices of these two materials does not exceed 0.2 and more preferably does not exceed 0.1. This case of combination of several materials exists when the texture is produced by embossing a sol-gel layer deposited on a transparent sheet, in particular made of glass. Thus, the texture can be produced in a first material added to a sheet of a second material. The sheet can also comprise more than two materials.

Preferably, two materials juxtaposed in the sheet have refractive indices, the difference of which does not exceed 0.2 and preferably does not exceed 0.1. This preference relates to the juxtaposition within the sheet of materials both present at more than 500 nm from the surface of the sheet, the surface of the sheet being in contact with ambient air. A material present at more than 500 nm from the surface of the sheet can also be present at the surface of the sheet, its thickness then being greater than 500 nm. The presence of a material more than 500 nm from the surface is determined orthogonally with respect to the true surface, which follows the texture, and not with respect to the general plane of the sheet. This preference with regard to the difference in refractive indices thus does not relate to an antireflective coating (antireflective layer or antireflective stack), which is in contact with ambient air and is generally made of materials with refractive indices quite distant from that on which it is deposited, and with a thickness of less than 500 nm. An antireflective layer or antireflective stack are thin coatings which do not modify the texture in relief on which they are applied. They follow the surface relief. This is why it may be said that an antireflective surface coating (layer or stack of layers), in contact with ambient air, is not the material comprising the texture according to the invention.

The material comprising the texture according to the invention is of sufficient thickness to confer, by itself alone, the texture on the surface. It can be covered with an antireflective coating (antireflective layer or stack having an antireflective effect) but this coating follows the surface relief given by the material comprising the texture. Thus, the material comprising the texture according to the invention is of sufficient thickness to constitute more than 90% and preferably more than 95% by volume of the material included between two planes parallel to the general plane of the sheet, one of which passes through the outermost point of the texture in contact with ambient air and the other of which passes through the innermost point of the texture in contact with ambient air. In practice, it is in this material that the texture is printed by a device comprising the same inverted relief or by chemical attack. The material comprising the texture is greater than 5 μm in thickness along a direction orthogonal to the true surface (which follows the surface texture) and greater than 5 μm in thickness along a direction orthogonal to the general plane of the sheet.

If the texture according to the invention does not comprise, at its surface, an antireflective layer or stack, then the material comprising the texture according to the invention is in contact with ambient air. If the texture according to the invention comprises, at its surface, an antireflective layer or stack, then it is the layer or the stack which is in contact with ambient air.

The texture in a monolithic material, in particular made of glass, can generally be produced by embossing or rolling with at least one textured roll, or by acid attack. The textured glass sheet obtained can be covered with an antireflective coating.

If the sheet according to the invention comprises a glass sheet, the latter is preferably thermally tempered. In order to do this, and for the case where an antireflective coating has to be applied to it, it is possible in particular to proceed as follows:

rolling glass at its softening temperature with at least one textured roll, resulting in a textured glass sheet, then cooling, then
  applying, to one or both faces of the textured sheet, one or more sol-gel layer(s) precursor of an antireflective coating, then
  heating the coated textured sheet, followed by a thermal tempering cooling; the heating is of use both in bringing the glass to the temperature which makes possible the tempering cooling but also in the curing of the sol-gel coating.

FIG. 1 shows the textured face of a glass sheet according to the invention, obtained by rolling and according to Example 1. The texture of a main face comprises hollow and contiguous pyramids having irregular bases. The degree of grayness reflects the depth of the points at the surface, the darkest regions being the deepest. Over each of FIGS. 1 to 3, the lightest points are at the same height and the darkest points are at the same height. The depth of the patterns is the difference in height orthogonally to the general plane of the plate between the lightest points and the darkest points.

Figure 2:
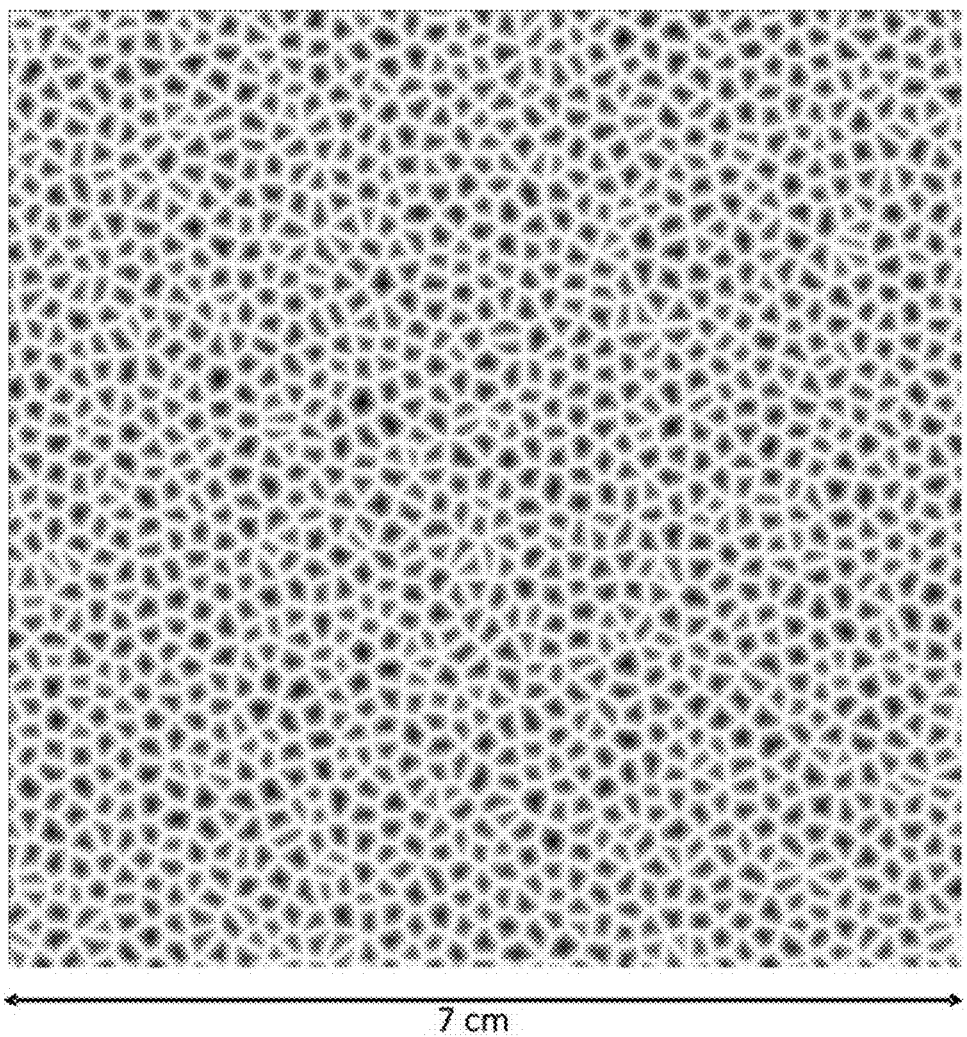

FIG. 2 shows the textured face of a glass sheet according to the invention, obtained by rolling and according to Example 2. The texture of a main face comprises hollow and contiguous pyramids having irregular bases. The pyramids are smaller than in the case of FIG. 1, so that the unintentionally rounded regions are greater. These rounded regions do not necessarily have the desired slope.

Figure 3:
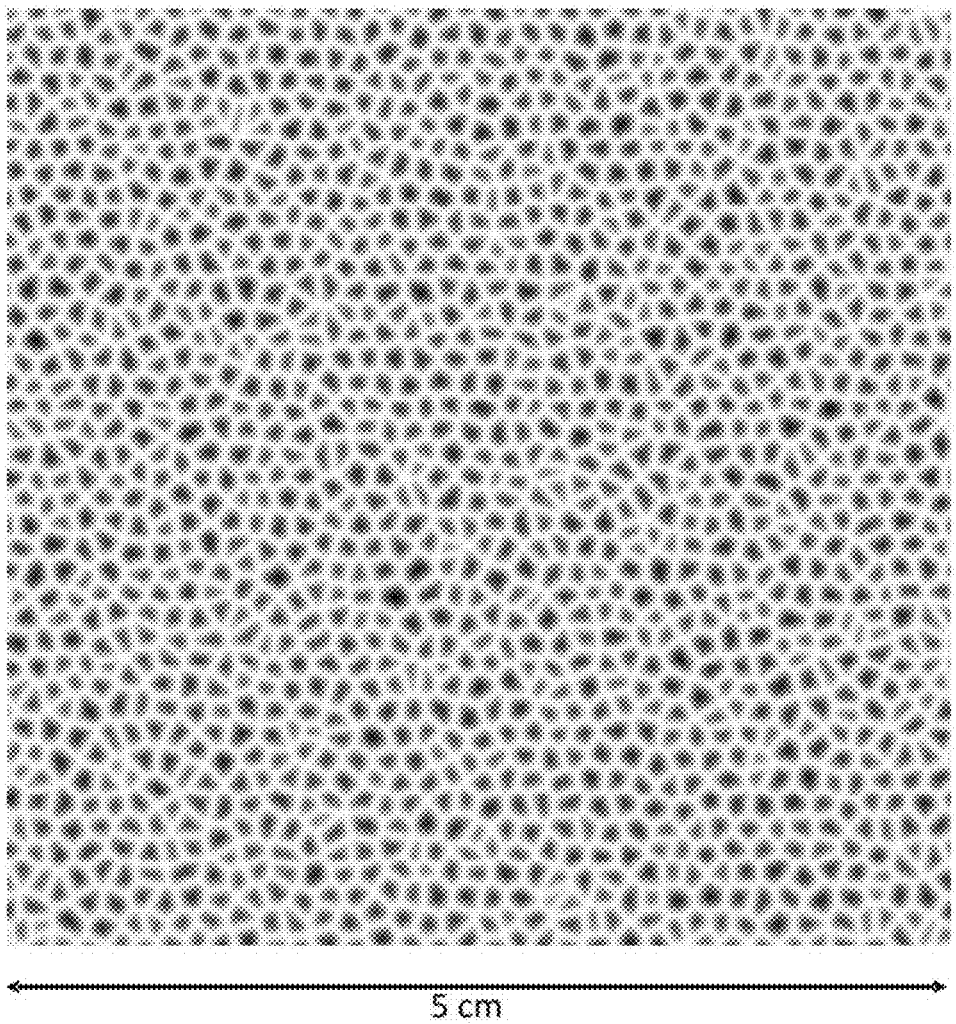

FIG. 3 shows the textured face of a glass sheet according to the invention, obtained by rolling and according to Example 3. The texture of a main face comprises hollow and contiguous pyramids having irregular bases. The pyramids are smaller than in the case of FIGS. 1 and 2, so that the unintentionally rounded regions are greater. These rounded regions do not necessarily have the desired slope.

Figure 4:
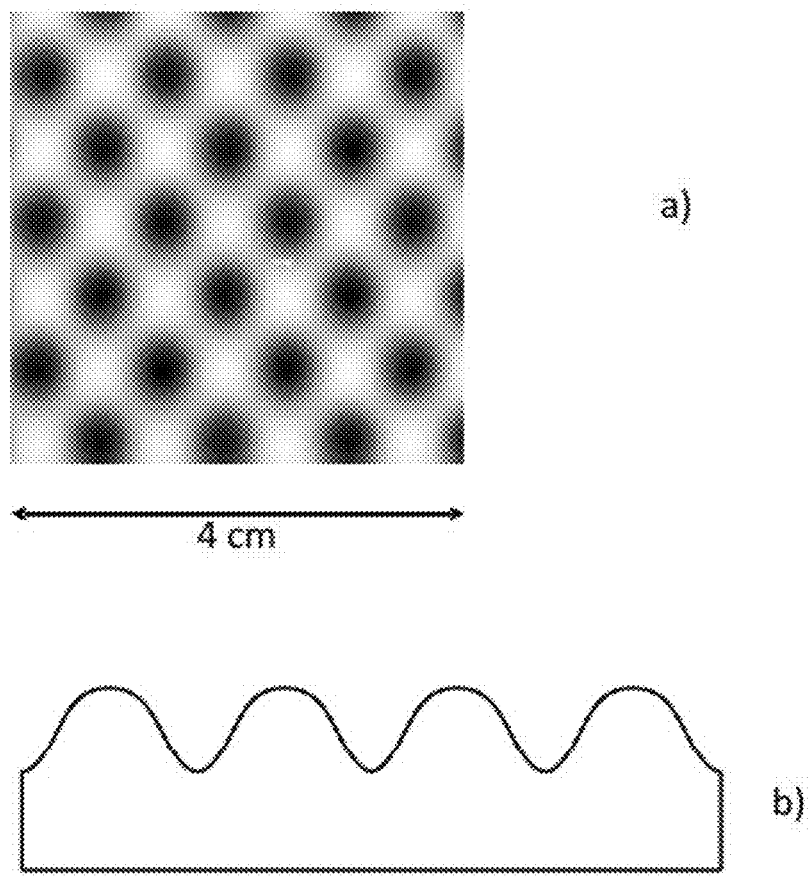

FIG. 4 shows the most strongly textured face of an Albarino-S sheet, top view in a) and side view in b). Of course, the patterns in b) are not to scale. It is shown here that the patterns are bosses uniformly distributed at the surface.

Figure 5:
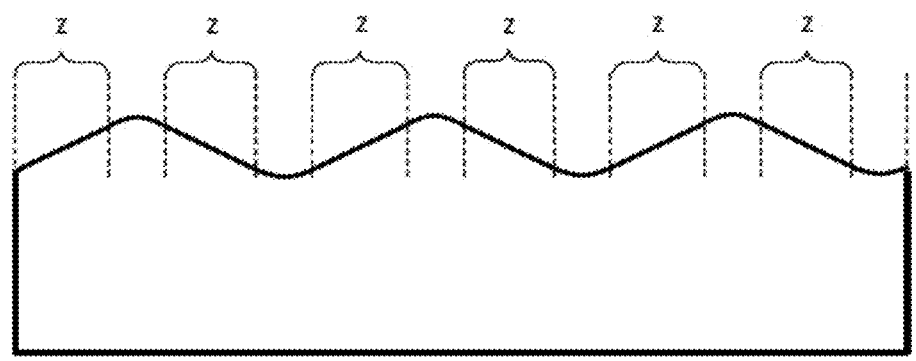
Figure 5:
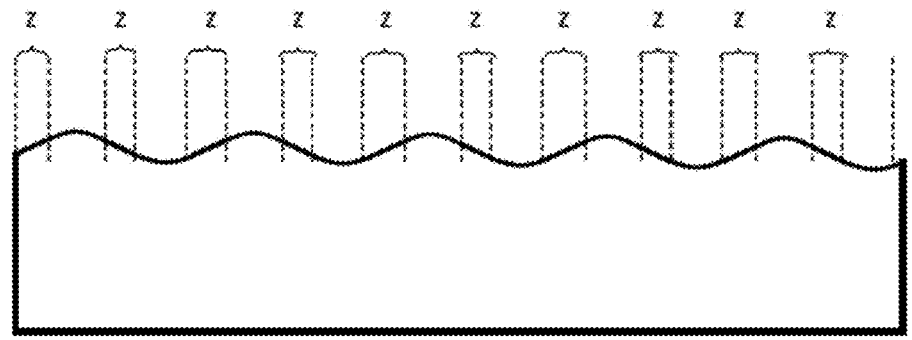

FIG. 5 illustrates the impact of a change in size of pyramidal patterns (and thus of a change in $R_{Sm}$). This is because the 2 textures in a) and b) have the same rounded sections with the same radii of curvature at the crests and hollows of the patterns. This is what is obtained in practice by rolling the glass with a textured roll having pyramids at its surface without rounded sections at the crests and hollows of the patterns. The texture of greater size in a) has a texture closer to the ideal texture since it comprises larger regions of suitable slope. The regions marked "z" are of suitable slope.

Figure 6:
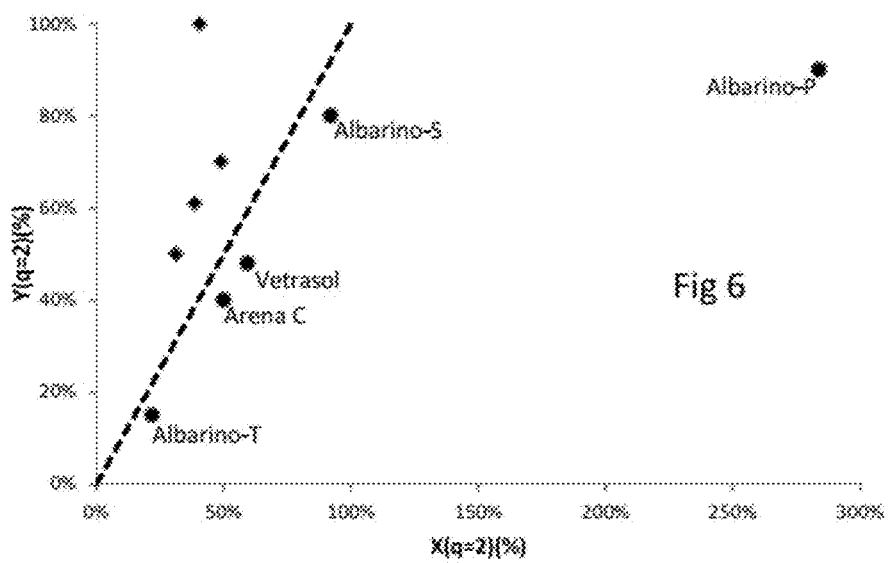

FIG. 6 shows, in the case of q=2, how the invention differs from the prior art by the straight line Y=X, with X=3%+18%*$P_m$*(n−1) because f(q)=18% for q=2. The points in this figure correspond to the examples of Table 1. The range of the invention lies above this straight line and above a horizontal straight line Y=10%.

Figure 7:
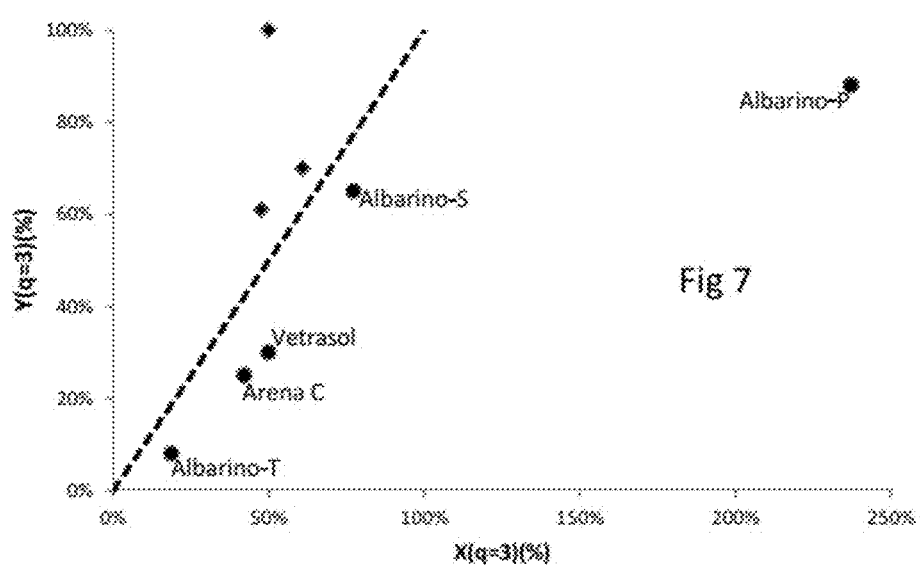

FIG. 7 shows, in the case of q=3, how the invention differs from the prior art by the straight line Y=X, with X=3%+15%*$P_m$*(n−1) because f(q)=15% for q=3. The points in this figure correspond to the examples of Table 2. The range of the invention lies above this straight line and above a horizontal straight line Y=10%.

Figure 8:
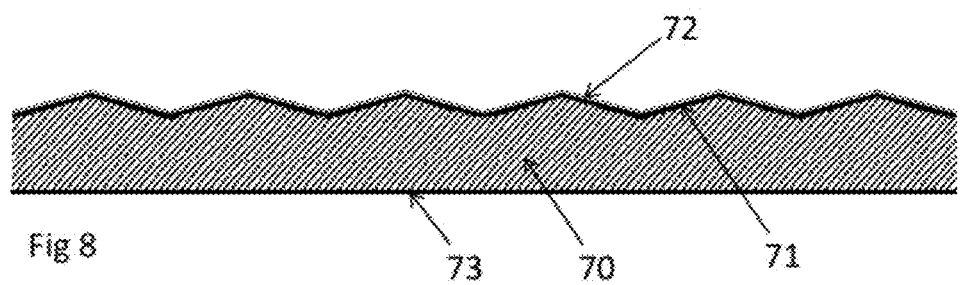

FIG. 8 shows a sheet 70 according to the invention in cross section. The textures and thicknesses are not to scale. This sheet 70 is made of a soda-lime-silica mineral glass obtained by rolling between two rolls, one of which was textured. The upper face 71 of the sheet exhibits a texture according to the invention with juxtaposed pyramidal patterns. An antireflective layer 72 was deposited on the textured face of the monolithic substrate. The second face 73 of the sheet is flat, without specific texture. The material comprising the texture is the material 70 and not the material of the layer 72.

Figure 9:
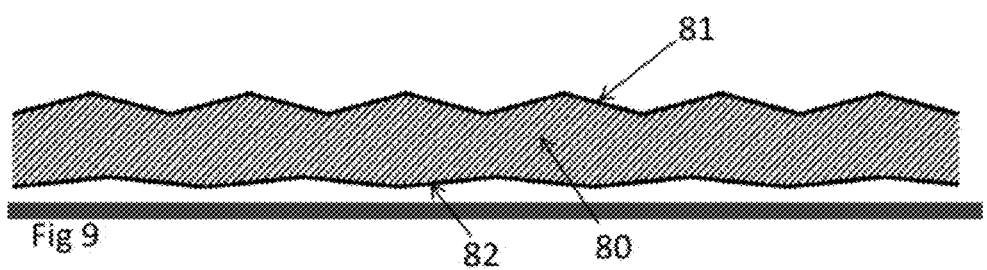

FIG. 9 shows a sheet 80 according to the invention in cross section. The textures and thicknesses are not to scale. This sheet 80 is made of a soda-lime-silica mineral glass obtained by rolling between two rolls, both textured. The upper face 81 of the sheet exhibits a texture according to the invention with juxtaposed pyramidal patterns. The second face 82 of the sheet exhibits a texture (according or not according to the invention) with juxtaposed pyramidal patterns, the mean slope over this second face 82 being lower than the mean slope over the first face 81. This sheet is completely monolithic. Its material comprises the textures of each face.

Figure 10:
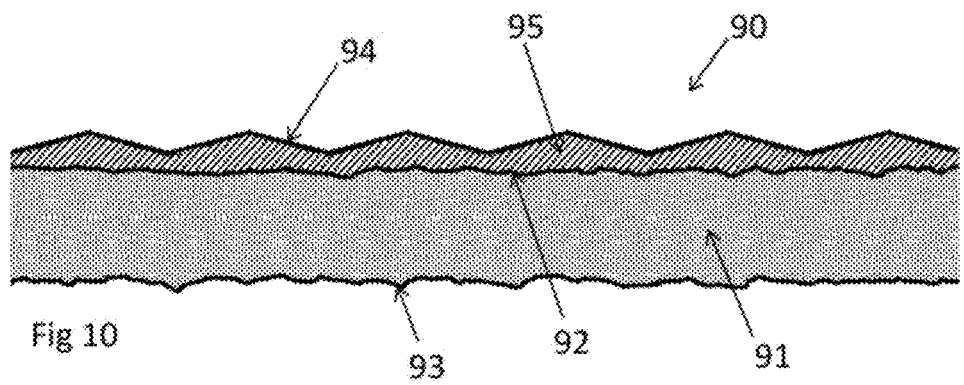

FIG. 10 shows a sheet 90 according to the invention in cross section. The textures and thicknesses are not to scale. A substrate sheet 91 made of soda-lime-silica glass gives its stiffness to the combination. This substrate sheet 91 is a mineral sheet obtained by hot rolling between two textured rolls. The two faces 92 and 93 of this substrate sheet 91 are consequently textured. It may be considered that the substrate sheet 91 is an Albarino-T sheet. A texture 94 according to the invention was produced above the face 92 of the substrate sheet 91 by embossing a sol-gel layer. The sol-gel material 95 and the material of the substrate sheet 91 exhibit similar refractive indices, the difference in their refractive indices not exceeding 0.1. In this instance, the material comprising the texture according to the invention is the sol-gel material 95.

In the examples which follow, the sheets had a thickness of 4 mm. The mean slope and the % of slope greater than q/(n−1) in degrees, q being equal to 2 for Examples 1 to 9 and to 3 for Examples 10 to 17, was varied. The results are given respectively in Tables 2 and 3. The haze values are measured at 1.5° for Examples 1 to 9 and at 2.5° for Examples 10 to 18. The TLH values are given with respect to flat glass of the same nature and with the same weight per unit area. It is thus the loss of TLH in %, denoted ΔTLH, with respect to flat glass which is concerned. This is because the flat glass necessary has a higher TLH value than the textured glasses in the same material. The aim is for ΔTLH to be as low as possible.

EXAMPLES 1 TO 9

For Examples 1 to 4, glass sheets exhibiting a main textured face, the texture of which is a repetition of hollow pyramidal patterns having an irregular base of different sizes, as reflected by the $R_{sm}$ value, are produced by rolling. The glazings of Examples 5 to 9 are commercially available and comparative. The textures obtained for Examples 1 to 3 are those shown respectively in FIGS. 1 to 3, the depth being the difference in height between the lightest points and the darkest points of these figures. From FIG. 1 to FIG. 3, an increase in the proportion of rounded regions not corresponding exactly to those desired is observed. The texture of Example 4 is similar in top view to that of FIG. 2, the difference being in the depth. Examples 5 to 9 correspond to characteristics measured on textured glasses sold under the brands appearing in the first column of the table. For all the examples, the refractive index of the mineral glass used was 1.52. In the table, X represents 3%+18%*$P_m$*(n−1) because f(q)=18% for q=2.

TABLE 1

| Example No. | Depth (μm) | Mean $R_{Sm}$ (mm) | $P_m$ (°) | X (%) | Y (%) | Haze (% at 1.5°) | ΔTLH (%) |
|---|---|---|---|---|---|---|---|
| 1 | 174 | 3.6 | 4 | 40.44 | 100 | 100% | 2 |
| 2 | 100 | 1.8 | 3.8 | 38.55 | 61 | 75% | 1.9 |
| 3 | 100 | 1.3 | 4.9 | 48.9 | 70 | 79% | 2.5 |
| 4 | 80 | 1.8 | 3 | 31.08 | 50 | 60% | 1.5 |
| 5 (Albarino-S) | — | 0.8 | 9.5 | 91.92 | 80 | 85% | 5 |
| 6 Albarino-T) | — | 0.8 | 2 | 21.72 | 15 | 20% | 1 |
| 7 (Albarino-P) | — | 2.5 | 30 | 283.8 | 90 | 95% | 15 |
| 8 (Arena C) | — | | 5 | 49.8 | 40 | 50% | 2.5 |
| 9 (Vetrasol) | — | | 6 | 59.16 | 48 | 56% | 3 |

It is found that, for Example 5, the haze value is good but that the TLH is greatly reduced. As regards Example 6, the haze value is extremely low. Examples 7 to 9 do not offer very good compromises in properties. Examples 1 to 4 offer excellent compromises in haze and TLH properties. This corresponds to the fact that, for these examples, Y>X.

EXAMPLES 10 TO 17

For Examples 10 to 12, glass sheets exhibiting a main textured face, the texture of which is a repetition of hollow pyramidal patterns having an irregular base of different sizes, as reflected by the $R_{Sm}$ value, are produced by rolling. The glazings of Examples 13 to 17 are commercially available and comparative. The textures obtained for Examples 10 to 12 are those shown respectively in FIGS. 1 to 3, the depth being the difference in height between the lightest points and the darkest points of these figures. These textures differ from those of Examples 1 to 3 in the depth, which is in this instance chosen to be deeper. Examples 13 to 17 correspond to characteristics measured on textured glasses sold under the brands appearing in the first column of Table 2. For all the examples, the refractive index of the mineral glass used was 1.52. In Table 2, X represents $3\%+15\%*P_m*(n-1)$ because $f(q)=15\%$ for $q=3$.

TABLE 2

| Example No. | Depth (μm) | Mean $R_{Sm}$ (mm) | $P_m$ (°) | X (%) | Y (%) | Haze (% at 2.5°) | ΔTLH (%) |
|---|---|---|---|---|---|---|---|
| 10 | 260 | 3.6 | 6 | 49.8 | 100 | 100% | 3 |
| 11 | 150 | 1.8 | 5.7 | 47.5 | 61 | 70% | 2.9 |
| 12 | 150 | 1.3 | 7.4 | 60.7 | 70 | 75% | 3.7 |
| 13 (Albarino-S) | — | 0.8 | 9.5 | 77.1 | 65 | 75% | 5 |
| 14 (Albarino-T) | — | 0.8 | 2 | 18.6 | 8 | 10% | 1 |
| 15 (Albarino-P) | — | 2.5 | 30 | 237.0 | 88 | 92% | 15 |
| 16 (Arena C) | — | | 5 | 42.0 | 25 | 30% | 2.5 |
| 17 (Vetrasol) | — | | 6 | 49.8 | 30 | 32% | 3 |

It is found that, for Example 13, the haze value is good but that the TLH is greatly reduced. As regards Example 14, the haze value is extremely low. Examples 13 to 17 do not offer very good compromises in properties. Examples 10 to 12 offer excellent compromises in haze and TLH properties. This corresponds to the fact that, for these examples, Y>X.

The invention claimed is:

1. A transparent sheet comprising a texture in relief on a first main face of its main faces to form a textured face, such that, if n is the refractive index of a material comprising the texture, $P_m$ is the mean slope in degrees of the textured face and Y(q) is the percentage of the textured surface with a slope greater than q/(n−1) in degrees, then the two cumulative conditions exist:

$$Y(q)>3\%+f(q)\%*P_m*(n-1)$$

and $Y(q)>10\%$ with $f(q)=24-(3*q)$ and $q=2$ or 3.

2. The sheet as claimed in claim 1, wherein $Y(q)>5\%+f(q)\%*P_m*(n-1)$.

3. The sheet as claimed in claim 2, wherein $Y(q)>10\%+f(q)\%*P_m*(n-1)$.

4. The sheet as claimed in claim 1, wherein $f(q)=27-(3*q)$, indeed even $f(q)=30-(3*q)$.

5. The sheet as claimed in claim 1, wherein $q=2$.

6. The sheet as claimed in claim 1, wherein $q=3$.

7. The sheet as claimed in claim 1, wherein one of the following combinations exists:

$Y(q)>5\%+f(q)\%*P_m*(n-1)$ with $f(q)=27-(3*q)$ and $q=2$; or $Y(q)>5\%+f(q)\%P_m*(n-1)$ with $f(q)=27-(3*q)$ and $q=3$; or $Y(q)>5\%+f(q)\%*P_m*(n-1)$ with $f(q)=30-(3*q)$ and $q=2$; or $Y(q)>5\%+f(q)\%*P_m*(n-1)$ with $f(q)=30-(3*q)$ and $q=3$; or $Y(q)>10\%+f(q)\%*P_m*(n-1)$ with $f(q)=27-(3*q)$ and $q=2$; or $Y(q)>10\%+f(q)\%*P_m*(n-1)$ with $f(q)=27-(3*q)$ and $q=3$; or $Y(q)>10\%+f(q)\%*P_m*(n-1)$ with $f(q)=30-(3*q)$ and $q=2$; or $Y(q)>10\%+f(q)\%*P_m*(n-1)$ with $f(q)=30-(3*q)$ and $q=3$.

8. The sheet as claimed in claim 1, wherein the refractive index of the material comprising the texture is within the range extending from 1.4 to 1.65 at 587 nm.

9. The sheet as claimed in claim 1, wherein the absorption of the sheet in the spectral range within the range extending from 400 to 700 nm is less than 2%.

10. The sheet as claimed in claim 1, wherein the material comprising the texture is made of mineral glass.

11. The sheet as claimed in claim 1, wherein the roughness of the textured surface is such that the mean $R_{Sm}$ is greater than 1 mm and less than 8 mm.

12. The sheet as claimed in claim 1, wherein the texture comprises contiguous patterns with a size within the range extending from 2 to 8 mm.

13. The sheet as claimed in claim 1, wherein its second main face also exhibits a texture such that $P_m*(n-1)$ is greater than $P_m'*(n'-1)$, $P_m'$ representing the mean slope of the second main face and n' being the refractive index of the material comprising the texture of the second main face.

14. The sheet as claimed in claim 13, wherein the texture of the second main face has a mean slope such that $P_m'*2*(n'-1)$ is less than 3°.

15. The sheet as claimed in claim 13, wherein, if Y'(q) is the percentage of the textured surface with a slope greater than q/(n'−1) in degrees of the second main face, then there exists the relationship:

$$Y'(q)>3\%+f(q)\%*P_m'*(n'-1)$$

with $f(q)=24-(3*q)$ and q having the value 2 both for Y(q) and for Y'(q), or q having the value 3 both for Y(q) and for Y'(q).

16. The sheet as claimed in claim 1, further comprising an antireflective coating on one or on its main faces.

17. A horticultural greenhouse equipped with a sheet of claim 1.

18. A process for the manufacture of a sheet of claim 1, the process comprising rolling the sheet with a textured engraved roll.

19. The process as claimed in claim 18, wherein the textured engraved roll supports patterns having a mean slope greater than the mean slope of the first main face of the sheet obtained.

20. The process as claimed in claim 19, wherein the textured engraved roll supports patterns having a mean slope greater by at least 0.5° than the mean slope of the first main face of the sheet obtained.

21. The process as claimed in claim 20, wherein the textured engraved roll supports patterns having a mean slope greater by at least 1° than the mean slope of the first main face of the sheet obtained.

22. The sheet as claimed in claim 9, wherein the absorption of the sheet in the spectral range within the range extending from 400 to 700 nm is less than 1%.

23. The sheet as claimed in claim 22, wherein the absorption of the sheet in the spectral range within the range extending from 400 to 700 nm is less than 0.5%.

24. The sheet as claimed in claim 11, wherein the roughness of the textured surface is such that the mean $R_{Sm}$ is greater than 1.5 mm.

25. The sheet as claimed in claim 24, wherein the roughness of the textured surface is such that the mean $R_{Sm}$ is greater than 2 mm.

26. The sheet as claimed in claim 14, wherein the texture of the second main face has a mean slope such that $P_m'*2*(n'-1)$ is less than 2°.

\* \* \* \* \*